United States Patent [19]

Wazaki et al.

[11] Patent Number: 4,877,273
[45] Date of Patent: Oct. 31, 1989

[54] OPERATION CONTROL SYSTEM FOR INTERNAL COMBUSTION ENGINES

[75] Inventors: Yoshio Wazaki; Keisuke Kudo, both of Wako, Japan

[73] Assignee: Honda Giken Kogyo K.K., Tokyo, Japan

[21] Appl. No.: 241,700

[22] Filed: Sep. 7, 1988

[30] Foreign Application Priority Data

Sep. 8, 1987 [JP] Japan .................................. 62-224811

[51] Int. Cl.$^4$ .............................................. F02D 29/06
[52] U.S. Cl. .................................. 290/40 C; 290/40 F; 123/339
[58] Field of Search ................ 290/40 R, 40 A, 40 C, 290/40 F, 51; 123/339, 349, 350

[56] References Cited

U.S. PATENT DOCUMENTS

| | | | |
|---|---|---|---|
| 4,307,690 | 12/1981 | Rau et al. | 290/40 R X |
| 4,625,281 | 11/1986 | Deutsch | 123/339 X |
| 4,633,093 | 12/1986 | Otobe et al. | 290/40 C X |
| 4,649,878 | 3/1987 | Otobe et al. | 290/40 R X |
| 4,682,044 | 7/1987 | Hotate et al. | 290/40 C X |
| 4,700,674 | 10/1987 | Iwata | 123/339 X |

*Primary Examiner*—William M. Shoop, Jr.
*Assistant Examiner*—W. E. Duncanson, Jr.
*Attorney, Agent, or Firm*—Arthur L. Lessler

[57] ABSTRACT

An operation control system for an internal combustion engine includes a first current detector for detecting a value of electric current flowing in a field winding of an AC generator of the engine, and an ECU responsive to the detected value of electric current for determining a control amount by which the operation of the engine is to be controlled, and for changing output torque of the engine in response to the determined control amount. A second current detector, preferably, a Hall element, detects a value of electric current flowing from the AC generator to electrical loads on the engine. The ECU detects a transient state of the electrical loads, based upon the detected value of electric current from the second current detector. The ECU is operable when the transient state is detected, for determining a transient correction amount of the determined control amount, in response to the detected value of electric current from the first current detector.

7 Claims, 4 Drawing Sheets

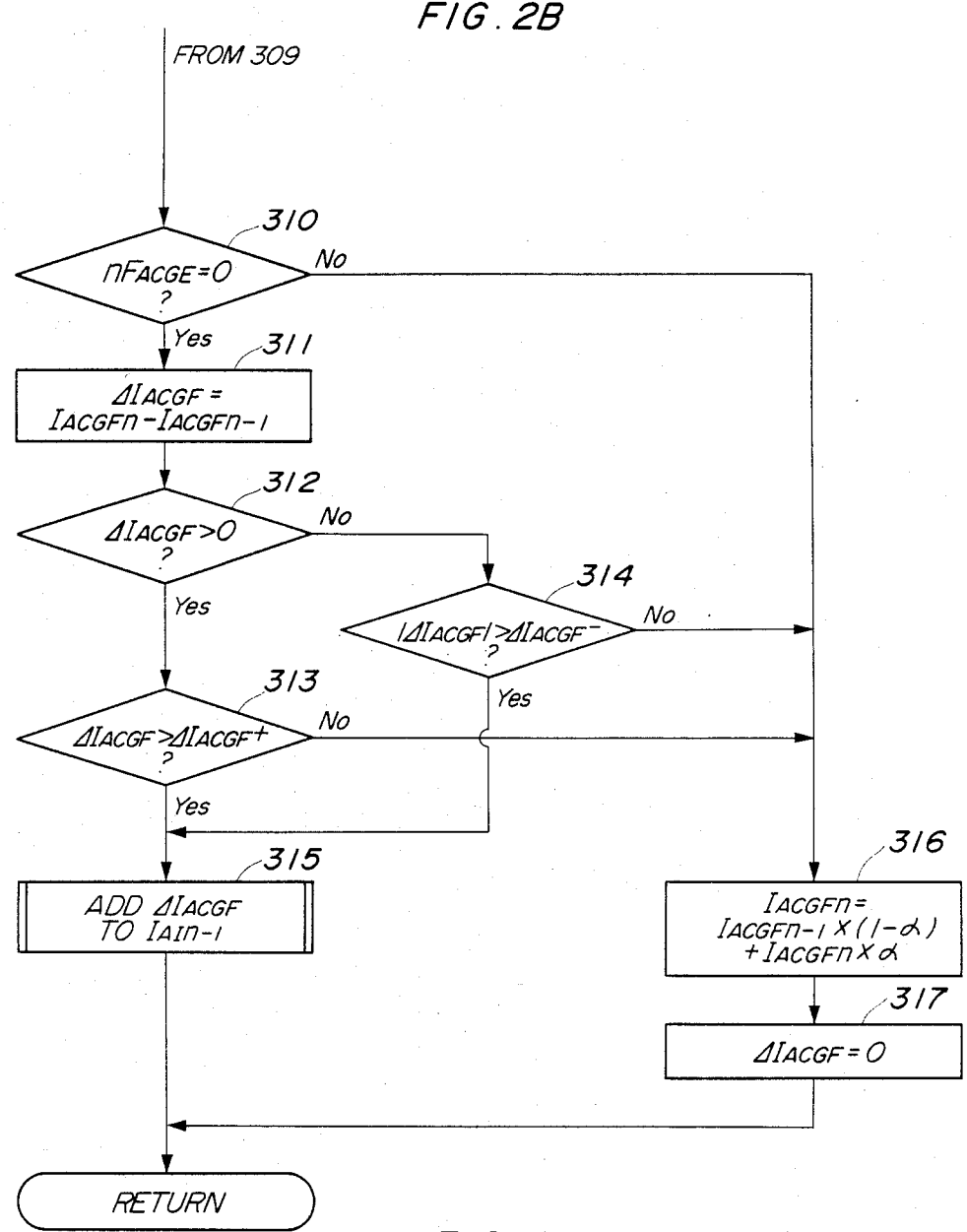

OPERATION CONTROL SYSTEM FOR INTERNAL COMBUSTION ENGINES

BACKGROUND OF THE INVENTION

This invention relates to an operation control system for internal combustion engines, and more particularly to an operation control system of this kind which can control the output of the engine by changing the output in quick response to a change in electrical load on an AC generator driven by the engine.

A control system for controlling an internal combustion engine is known e.g. from Japanese Provisional Patent Publications (Kokai) Nos. 60-150449 and 61-81546, which detects the magnitude of electrical loads applied on the engine from field current flowing in a field winding of an AC generator, calculates a correction value corresponding to the field current, and corrects the valve opening period of a control valve which controls the amount of intake air supplied to the engine, by means of the calculated correction value, to thereby control the output of the engine in response to the magnitude of electrical loads.

The known system is advantageous in being capable of accurately controlling the engine output in response to the magnitude of electrical loads when the electrical loads are in steady state, since the field current exactly represents the magnitude of the electrical loads applied on the engine.

However, the system has the following problem encountered when the electrical loads are in transient state, i.e. when they are changing: In conventional AC generators for automotive engines, usually field current is on-off controlled. Therefore, to detect the field current, the on-off controlled field current is converted into analog current by means of a filter means having a large time constant. More specifically, the field current is on-off controlled by means of a voltage regulator so that the output voltage of the AC generator or that of a battery connected in parallel therewith is maintained constant. A detector for detecting the filed current is provided with a filter means having a large time constant for smoothing the field current to thereby detect same with accuracy. The filter means comprises a hand filter which converts the field current into a ripple-contained voltage, and a soft filter which smooths or averages the ripple-contained voltage when the electrical loads are in steady state.

However, the use of the filter means for detecting the field current actually involves a time delay in the detection of a change in the magnitude of electrical loads.

That is, since the field current is detected with a time lag corresponding to the time constant of the filter means, the correction of the intake air amount which is started upon the detection of a change in the field current is too late for the engine output to be changed in accordance with the change in the field current or in the magnitude of electrical loads. This control delay can cause a drop in the rotational speed of the engine, for example. Thus, in the conventional engine operation control system, the engine output control is difficult to carry out with high accuracy and high responsiveness to a transient state of the electrical loads on the engine.

SUMMARY OF THE INVENTION

It is the object of the invention to provide an operation control system for an internal combustion engine, which is capable of controlling the output of the engine in quick response to a change in the magnitude of electrical loads on the engine.

To attain the above object, the present invention provides a system for controlling an operation of an internal combustion engine having an AC generator mechanically driven by the engine and having a field winding, and at least one electrical load electrically driven by the AC generator, the system including first current detecting means for detecting a value of electric current flowing in the field winding of the AC generator, control amount determining means responsive to the detected value of electric current from the first current detecting means for determining a control amount by which the operation of the engine is to be controlled, and output torque changing means responsive to the determined control amount from the control amount determining means for changing output torque of the engine.

The system according to the invention is characterized by an improvement comprising:

second current detecting means for detecting a value of electric current flowing from the AC generator to the at least one electrical load;

transient state detecting means for detecting a transient state of the at least one electrical load, based upon the detected value of electric current from the second current detecting means; and transient correction amount determining means operable when the transient state is detected by the transient state detecting means, for determining a transient correction amount of the control amount determined by the control amount determining means, in response to the detected value of electric current from the first current detecting means.

Preferably, the transient state detecting means decides that the at least one electrical load is in the transient state when a variation in the detected value of electric current from the second current detecting means is larger than a predetermined value in a direction in which the electric current varies.

Also preferably, the transient correction amount determining means determines a correction value from the detected value of electric current from the first current detecting means, determines a variation of the determined correction value, and adapts the determined variation as the transient correction amount if the determined variation is larger than a predetermined value in a direction in which the determined correction value varies.

Preferably, the transient correction amount determining means continually determines the transient correction amount over a predetermined period of time from the time the transient state is first detected by the transient state detecting means, irrespective of whether the detected transient state terminates before the lapse of the predetermined period of time.

Also preferably, the second current detecting means comprises a Hall element.

The operation control system according to the invention may typically be embodied as an intake air supply control system, particularly an auxiliary air supply control system, for an internal combustion engine.

The above and other objects, features, and advantages of the invention will be more apparent from the following detailed description taken in conjunction with the accompanying drawings.

BRIEF DESCRIPTION OF THE DRAWINGS

FIGS. 2, 2A and 2B are a flowchart showing a manner of setting a correction amount of driving current for an auxiliary air control valve appearing in FIG. 1.

DETAILE DESCRIPTION

The invention will be described in detail with reference to the drawings showing an embodiment thereof.

Figure 1:
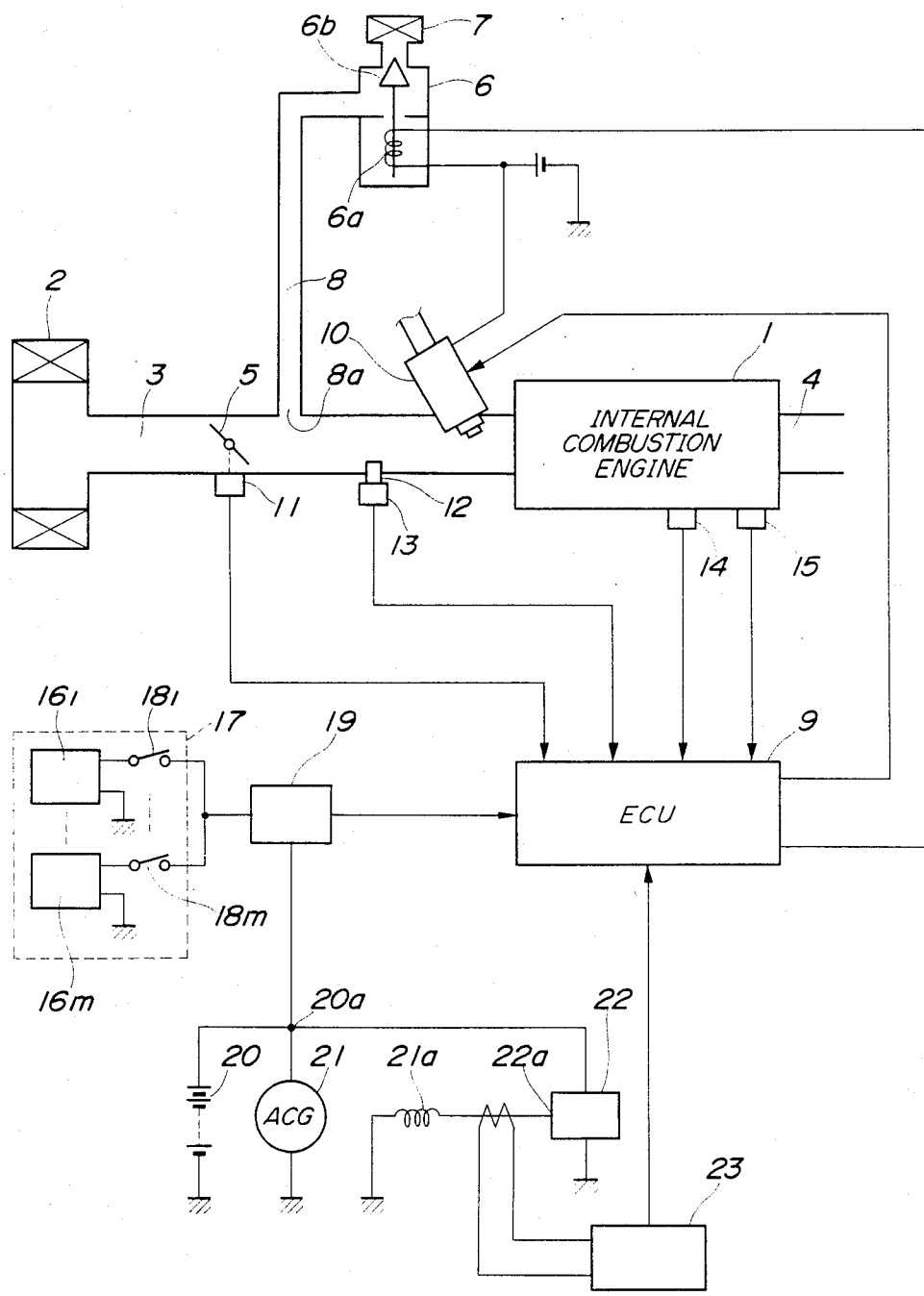
FIG. 1 is a block diagram showing the entire arrangement of an auxiliary air supply control system as an engine operation control system for an internal combustion engine, according to an embodiment of the invention.

Referring first to FIG. 1, there is illustrated an operation control system for an internal combustion engine, according to the invention, in which the operation control system is embodied as an auxiliary air supply control system. In the figure, reference numeral 1 designates an internal combustion engine which may be a four-cylinder type, for example. Connected to the engine 1 are an intake pipe 3 provided with an air cleaner 2 at an open end thereof, and an exhaust pipe 4. Arranged in the intake pipe 3 is a throttle valve 5, which is bypassed by an air passage 8 with one end 8a thereof opening into the interior of the intake pipe 3 at a downstream side of the throttle valve 5, and the other end communicating with the atmosphere and provided with an air cleaner 7. Arranged across the air passage 8 is an auxiliary air control valve (hereinafter merely referred to as "the control valve") 6, which is a normally-closed type solenoid valve which may be formed by a linear solenoid 6a, and a valve body 6b disposed to open the air passage 8 when the solenoid 6a is energized, the solenoid 6a being electrically connected to an electronic control unit (hereinafter referred to as "the ECU") 9.

Fuel injection valves 10, only one of which is shown, are mounted in the intake pipe 3 at locations between the engine 2 and the open end 8a of the air passage 8, and are mechanically connected to a fuel pump, not shown, and also electrically connected to the ECU 9.

A throttle opening ($\theta_{TH}$) sensor 11 is connected to the throttle valve 5. an absolute pressure ($P_{BA}$) sensor 13 is provided in communication with the interior of the intake pipe 3 through a conduit 12 at a location downstream of the open end 8a of the air passage 8. An engine coolant temperature ($T_W$) sensor 14 and an engine rotational speed (Ne) sensor 15 are mounted on the engine 1, and are electrically connected to the ECU 9.

Reference numerals $16_1$–$16_m$ represent various electrical device such as head lamps of an automotive vehicle in which the engine is installed, and a heater fan of an air conditioner. These electrical devices will be generically referred to as "the electrical load 17" unless otherwise specified. Each of the electrical devices $16_1$–$16_m$ has a feeding terminal to which a switch $18_1$–$18_m$ is connected. The switches $18_1$–$18_m$ are connected to a junction 20a through a Hall element 19 as load current detecting means. The electrical devices $16_1$–$16_m$ each have an earth terminal grounded. Connected in parallel between the junction 20a and ground are a battery 20, an AC generator 21, and a voltage regulator 22. The voltage regulator 22 controls field current supplied to a field winding 21a of the AC generator in accordance with the magnitude of the electrical load, i.e. the electrical devices $16_1$–$16_m$.

The Hall element 19 detects the value of electric current indicative of the magnitude of the electrical load, flowing to the electrical load 17 from the AC generator 21 and the battery 20, and supplies an output signal EL indicative of the detected current to the ECU 9.

A current detector 23 is connected between a field current output terminal 22a of the voltage regulator 22 and the field winding 21a. The current detector 23 may be of the conventional type having a large time-constant filter as aforementioned and forms field current detecting means for detecting field current flowing in the field winding 21a of the AC generator 21. The current detector 23 supplies the ECU 9 with an output signal representative of a generating state of the AC generator, e.g. a voltage signal $V_{ACGF}$ having a voltage level corresponding to the magnitude of field current supplied from the voltage regulator 22 to the AC generator 21.

The AC generator is mechanically connected to an output shaft, not shown, of the engine 1 to be driven thereby. When any of the switches $18_1$–$18_m$ is closed, electric power is supplied from the AC generator 21 to a corresponding one of the electrical devices $16_1$–$16_m$. If the amount of electric power that is required by those of the electrical devices $16_1$–$16_m$ which are operating exceeds the generating capacity of the AC generator 21, the battery 20 supplies electric power for the shortage.

The ECU 9 is supplied with engine operating parameter signals from the throttle valve opening sensor 11, the absolute pressure sensor 13, the engine coolant temperature sensor 14, the engine rotational speed sensor 15, etc., a signal indicative of electrical load current from the Hall element 19, and a signal indicative of the generating state from the current detector 23. Based upon these signals, the ECU 9 determines operating conditions and load conditions, such as the magnitude of the electrical load of the engine, sets a desired engine rotational speed to be maintained in an idling condition of the engine, calculates a fuel supply quantity for the engine i.e., a valve opening period $T_{OUT}$ for the fuel injection valves 10, and an amount of auxiliary air, i.e., an amount of driving current for the solenoid 6a of the control valve 6, and supplies the resulting driving signals to the fuel injection valves 10 and the control valve 6 to actuate same.

The driving current $I_{OUT}$ for driving the solenoid 6a of the control valve 6 is calculated by the following equation (1):

$$I_{OUT} = I_{AIn} + I_p \tag{1}$$

where $I_p$ represents a proportional control term, and $I_{AIn}$ represents an integral control term. The proportional control term $i_p$ may be the product of the difference $\Delta N$ between the desired engine rotational speed and the actual engine rotational speed and a proportional control gain $K_p$. The integral control term $I_{AIn}$ may be determined by the following equation (2):

$$I_{AIn} = I_{AIn-1} + K_I \times \Delta N + \Delta I_{ACGF} \tag{2}$$

where $I_{AIn-1}$ is an integral control term obtained in the last loop, $K_I$ an integral control gain, and $\Delta I_{ACGF}$ a variation in an electrical load-dependent correction value $I_{ACGF}$ which is set in accordance with the magnitude of field current flowing to the AC generator 21, by executing a control program of FIG. 2, described later.

The solenoid 6a of the control valve 6 is energized by the driving current $I_{OUT}$ calculated as above to open the valve body 6b, i.e., the air passage 8, to an opening degree corresponding to the magnitude of the same current so that a required amount of auxiliary air corresponding to the opening degree is supplied to the engine 1 through the air passage 8 and the intake pipe 3.

On the other hand, the fuel injection valves 10 are opened over the valve opening period $T_{OUT}$ calculated by the ECU 9 to inject fuel into the intake pipe 3 so that a mixture having a desired air-fuel ratio is supplied to the engine 1.

When the opening degree of the control valve 6 is increased to increase the amount of auxiliary air supplied therethrough, a correspondingly increased amount of the mixture is supplied to the engine to thereby increase the engine output and hence the engine rotational speed. Conversely, if the opening degree of the control valve 6 is decreased, the resulting mixture amount is decreased to lower the engine rotational speed. In this way, by varying the auxiliary air amount, i.e., the opening degree of the control valve 6, it is possible to control the engine output torque and hence the engine rotational speed.

Figure 2A:
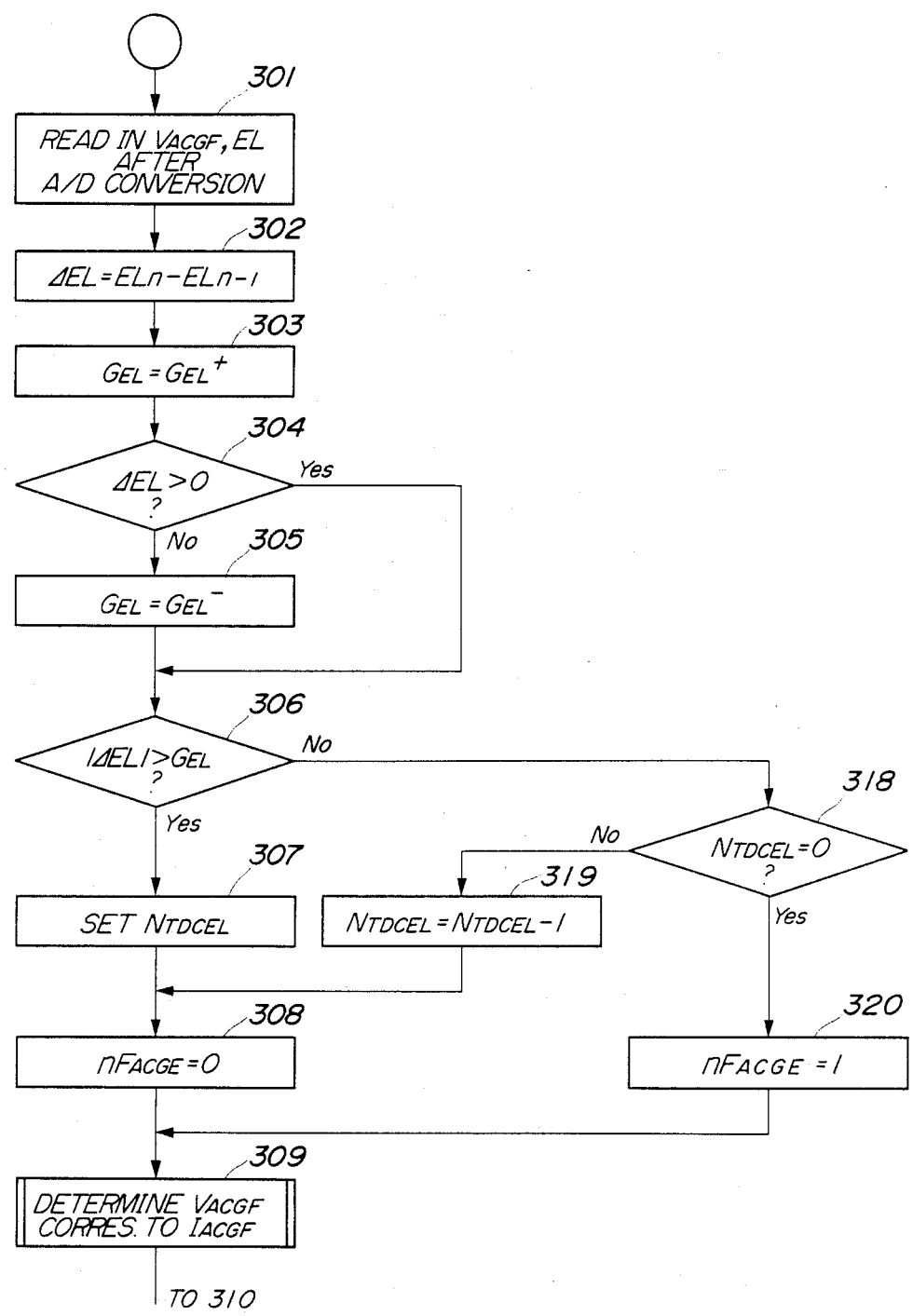

FIG. 2 shows a flowchart of a control program for calculating a correction amount of driving current for the control valve 6 in accordance with the magnitude of electrical load, particularly a transient correction amount of the driving current applied at a change in the magnitude of electrical load. The present program is executed whenever each pulse of a TDC (top-dead-center) signal supplied from the engine rotational speed sensor 15 which pulse is generated at a predetermined crank angle of each cylinder of the engine slightly before the top-dead-center position of the cylinder corresponding to the intake stroke thereof.

First, at a step 301, the ECU 9 reads in a value of the signal $V_{ACGF}$ indicative of the field current of the AC generator, supplied from the current detector 23 in FIG. 1, and a value of the signal EL indicative of electrical load current supplied from the Hall element 19. In actuality, these signal values $V_{ACGF}$ and EL have been subjected to A/D (analog-to-digital) conversion into digital values, and then the digital values are read in. Then, the ECU 9 calculates the difference $\Delta EL$ between a value $EL_{n-1}$ of the signal EL read in at the step 301 in the last loop and a value $EL_n$ of same read in the present loop, i.e., a variation $\Delta EL$ in the electrical load current between the last loop and the present loop, at a step 302. Next, at a step 303, a discriminating value $G_{EL}$ for determining the magnitude of the variation $\Delta EL$, which is used at a step 306, referred to later, is set to a predetermined value $G_{EL}+$, followed by determining whether the variation $\Delta EL$ is larger than 0 at a step 304. If the answer is negative or No, that is, if $\Delta EL$ is not positive, the discriminating value $G_{EL}$ is set to a predetermined value $G_{EL}-$ which is applied if the variation $\Delta EL$ is negative, at a step 305. If the answer to the question of the step 304 is affirmative or yes, the program skips the step 305 over to a step 306 wherein it is determined whether the absolute value $|\Delta EL|$ of the variation $\Delta EL$ is larger than the set predetermined value $G_{EL}$. The above steps 304-306 are for determining whether the variation $\Delta EL$ in the magnitude of the electrical load remains within a range defined by the positive and negative predetermined values $G_{EL}+$ and $G_{EL}-$, to thereby decide whether to change the engine output. A change in the current indicative of the actual magnitude of electrical load, flowing from the AC generator 21 and the battery to the electrical load 17 takes place immediately upon a change in the on-off state of the electrical load 17 and is detected immediately by the Hall element 19 without a time lag. Therefore, a change in the magnitude of electrical load 17 is detected immediately without a time delay by the ECU 9 through the Hall element 19.

If the answer to the question of the step 306 is affirmative or Yes, that is, if the absolute value of variation $\Delta EL$ exceeds the above predetermined range, the ECU 9 decides that the engine output is to be changed by varying the auxiliary air amount supplied through the control valve, and hence corrects the operating amount of the control valve 6. To be specific, the number of TDC signal pulses over which correction of the engine output is to be effected at the time of a transient state of the electrical load is set to a predetermined number $N_{TDCEL}$ (e.g., 3 TDC signal pulses) at a step 307 (see FIG. 3). A flag $F_{ACGE}$ is set to 0 at a step 308. The flag $F_{ACGE}$ will be used for a determination at a step 310, referred to later and is set to 0 when there has occurred a change in the magnitude of electrical load 17, whereas it is set to 1 when no change has occurred in the electrical load magnitude and hence no correction of the engine output is required.

Then, at a step 309, a value of the electrical load-dependent correction value $I_{ACGF}$ is set to a value corresponding to the detected value of the generating state signal read in at the aforementioned step 301, e.g. by the use of an $I_{ACGF} - V_{ACGF}$ table, not shown. This correction value $I_{ACGF}$ is set such that the intake air amount is corrected to increase with increase of the field current of the AC generator 21 so as to maintain the idling rotational speed of the engine constant even with an increase in the field current.

At the step 310, it is determined whether the flag $F_{ACGE}$ is 0 or not. If the answer is affirmative or Yes, that is, if such a large change in the electrical load-indicative current as necessitates changing the engine output has been detected, the program proceeds to a step 311, wherein the difference $\Delta I_{ACGF}$ between a value $I_{ACGFn}$ of the correction value $I_{ACG}$ obtained in the present loop and a value $I_{ACGn-1}$ of same obtained in the last loop is calculated as the amount of variation in the electrical load magnitude, followed by determining whether or not the calculated difference or variation $\Delta I_{ACGF}$ is larger than 0 at a step 312. If the variation $\Delta I_{ACGF}$ is larger than 0, it is determined at a step 313 whether or not the variation $\Delta I_{ACGF}$ is larger than a first predetermined value $\Delta I_{ACGF}+$, whereas it is determined at a step 314 whether or not the absolute value $|\Delta I_{ACGF}|$ of the variation is larger than a second predetermined value $\Delta I_{ACGF}-$.

Figure 3:
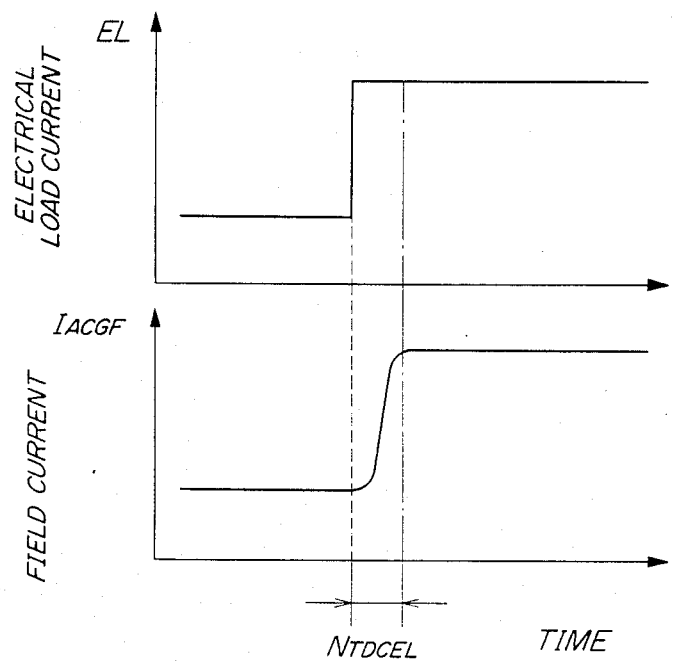
FIG. 3 is a timing chart showing a time delay in a field current-dependent correction value $I_{ACGF}$ relative to a change in the magnitude of electrical loads.

When the answer to the question of the step 313 or 314 is affirmative or Yes, that is, if it is determined at the step 313 that the variation $\Delta I_{ACGF}$ is larger than the first predetermined value $\Delta I_{ACGF}+$, or it is determined at the step 314 that the absolute value $|\Delta I_{ACGF}|$ of the variation is larger than the second predetermined value $\Delta I_{ACGF}-$, this means that there has occurred such a large change in the on-off state of the electrical devices as causes a relatively large change in the load on the engine. In such a case, there is the possibility that there will occur a sudden decrease in the engine rotational speed (if the electrical load has increased as shown in FIG. 3), or a sudden increase therein. Therefore, to correct the operating amount of the control valve 6, e.g.

increase the amount of auxiliary air, to prevent a sudden change in the engine rotational speed, the program proceeds to a step 315, wherein the variation $\Delta I_{ACGF}$ determined at the step 311 is added to the integral control term $I_{AIn-1}$ obtained in the last loop in the equation (2), followed by terminating the program.

In this way, immediately upon detection of a change in the magnitude of electrical load at the step 306, the correction of auxiliary air amount is started to thereby change the engine output more promptly than the conventional manner of starting the correction after detection of a change in the field current of the AC generator. Therefore, a drop in the engine rotational speed can be reduced or prevented which would conventionally take place due to control lag.

If the answer to the question of the step 313 or 314 is negative or No, that is, if the variation $\Delta I_{ACGF}$ is positive and at the same time smaller than the first predetermined value $\Delta I_{ACGF}+$ or the absolute value $|\Delta A_{CGF}|$ is smaller than the second predetermined value $\Delta I_{ACGF}-$, this means than the change in the electrical load magnitude is so small that there will not take place a sudden change in the engine rotational speed. Therefore, the program proceeds to a step 316 to determine a value of the electrical load-dependent correction value $I_{ACGF}$ for the present loop, by the following equation (3):

$$I_{ACGFn} = I_{ACGn-1} \times (1-a) + I_{ACGn} \times a \qquad (3)$$

where $a$ is a calibration coefficient set in dependence on the dynamic characteristic of the engine. For example, it is set to 0.25.

The ground for thus setting the $I_{ACGn}$ value to a smaller value by the use of the calibration coefficient $a$ when the change in the electrical load magnitude is small lies in filtering of the field current. More specifically, the detected voltage from the field current detector 23 contains some ripple even though it has been filtered inside the detector 23. Therefore, when the electrical load is in steady state, the step 316 is executed to average the detected field current.

However, the $I_{ACGF}$ value calculated by the equation (3) as above is not used in the control of changing the auxiliary air amount, but is intended to be used in calculating the variation $\Delta I_{ACGF}$ at the step 311 when a relatively large change is detected in the magnitude of electrical load 17 in the next loop et seq.

Following the calculation of the $I_{ACGn}$ value at the step 316, the program proceeds to a step 317, wherein the variation $\Delta I_{ACGF}$ determined at the step 311 is set to 0, because the change in the electrical load magnitude taking place during feedback control of auxiliary air amount is so small that it is not necessary to correct the integral control term $I_{AIn}$ by the variation $\Delta I_{ACGF}$. Then, the program is terminated.

The transient correction of auxiliary air amount, i.e. addition of $\Delta I_{ACGF}$ to $I_{AIn-1}$, at the step 315 is repeatedly executed whenever a TDC signal pulse is generated from the time the value of the voltage signal EL indicative of the electrical load-indicative current has stepwise changed due to an increase in the electrical load until the time period of generation of the predetermined number of TDC pulses elapses, as shown in FIG. 3.

That is, as seen in FIG. 3, the electrical load-dependent correction value $I_{ACGF}$ is continually increased from the time of change of the signal value EL and even after the value $\Delta EL$ has been reduced to 0, that is, until it reaches a value corresponding to the variation values $\Delta I_{ACGF}$ and the predetermined TDC signal pulse number $N_{TDCEL}$.

When a change is no more detected in the magnitude of electrical load 17 so that the answer to the question of the step 306 becomes negative or No, it is determined at a step 318 whether or not the TDC signal pulse number $N_{TDCEL}$ has been reduced to 0. If the answer is negative or no, the number $N_{TDCEL}$ is reduced by 1 at a step 319 and the steps 318 et seq. are repeated.

When the TDC signal pulse number $N_{TDCEL}$ has been reduced to 0 so that the answer to the question of the step 318 becomes affirmative or Yes, the flag $N_{FACGE}$ is set to 1 at a step 320, thus completing the correction of auxiliary air amount for a transient state of the electrical load. That is, the answer to the question of the step 310 becomes negative or No, and then the steps 316 and 317 are executed, followed by termination of the program.

The reason for continually increasing the electrical load-dependent correction value $I_{ACHF}$ until the TDC signal pulse number $N_{TDCEL}$ has been reduced to zero as above is as follows: The timing of occurrence of a change in the load on the engine caused by a change in the electrical load depends upon a change in the generating amount of the AC generator. Therefore, for instance, to increase engine output at the same timing of occurrence of an increase in the field current caused by an increase in the electrical load will result in good engine output control. However, an AC generator system in general has such a characteristic that there is a large time lag from an increase in the electrical load to a corresponding increase in the field current. Therefore, the TDC signal pulse number $N_{TDCEL}$ is set at a value dependent upon the time lag so as to deal with the increase in the field current which surely follows the lapse of the time lag.

Although in the embodiment described above, the auxiliary air control is effected by varying the magnitude of driving current applied to the solenoid 6a of the control valve 6, this is not limitative to the invention, but a duty-controlled type solenoid valve may alternatively be employed as the control valve 6, wherein the valve opening duty factor of the valve is controlled.

Since the operation control system according to the invention is constructed as described above, it is possible to immediately detect a change in the electrical load and hence immediately start transient correction of a factor for changing the engine output, thereby enhancing the responsiveness in controlling the engine output and hence avoiding a drop in the engine rotational speed.

The auxiliary air control system is not limited to the illustrated and described type comprising an air passage 8 bypassing the throttle valve, and a control valve 6 for varying the opening area of the air passage 8. Any type may be employed insofar as it can vary the total intake air amount. For example, it may be constituted by an actuator of an electromagnetic type, a pressure-responsive type, etc., which is drivingly connected to the throttle valve to forcibly open same.

Although in the above described embodiment the operation control system is embodied as an auxiliary air supply control system, the present invention may be applied to any other systems insofar as they can change the output torque of an internal combustion engine. For example, the invention may be applied to an ignition timing control system which advances or retards the ignition timing of an internal combustion engine.

What is claimed is:

1. In a system for controlling an operation of an internal combustion engine having an AC generator mechanically driven by said engine and having a field winding, and at least one electrical load electrically driven by said AC generator, said system including first current detecting means for detecting value of electric current flowing in said field winding of said AC generator, control amount determining means responsive to the detected value of electric current from said first current detecting means for determining a control amount by which the operation of said engine is to be controlled, and output torque changing means responsive to the determined control amount from said control amount determining means for changing output torque of said engine, the improvement comprising:
second current detecting means for detecting a value of electric current flowing from said AC generator to said at least one electrical load;
transient state detecting means for detecting a transient state of said at least one electrical load, based upon the detected value of electric current from said second current detecting means; and
transient correction amount determining means operable when said transient state is detected by said transient state detecting means, for determining a transient correction amount of the control amount determined by said control amount determining means, in response to the detected value of electric current from said first current detecting means.

2. A system as claimed in claim 1, wherein said transient state detecting means decides that said at least one electrical load is in said transient state when a variation in the detected value of electric current from said second current detecting means is larger than a predetermined value in a direction in which the electric current varies.

3. A system as claimed in claim 1 or claim 2, wherein said transient correction amount determining means determines a correction value from the detected value of electric current from said first current detecting means, determines a variation of the determined correction value, and adapts the determined variation as said transient correction amount if the determined variation is larger than a predetermined value in a direction in which the determined correction value varies.

4. A system as claimed in claim 1, wherein said transient correction amount determining means continually determines the transient correction amount over a predetermined period of time from the time said transient state is first detected by said transient state detecting means, irrespective of whether the detected transient state terminates before the lapse of said predetermined period of time.

5. A system as claimed in any of claims 1, 2 and 4, wherein said second current detecting means comprises a Hall element.

6. In an intake air supply control system for controlling the amount of intake air supplied to an internal combustion engine having an AC generator mechanically driven by said engine and having a field winding, and at least one electrical load electrically driven by said AC generator, said system including first current detecting means for detecting a value of electric current flowing in said field winding of said AC generator, intake air amount determining means responsive to the detected value of electric current from said first current detecting means for determining a required amount of intake air supplied to said engine, and output torque changing means responsive to the determined required amount of intake air from said intake air amount determining means for changing the amount of intake air supplied to said engine to thereby change output torque of said engine, the improvement comprising:
second current detecting means for detecting a value of electric current flowing from said AC generator to said at least one electrical load;
transient state detecting means for detecting a transient state of said at least one electrical load, based upon the detected value of electric current from said second current detecting means; and
transient correction amount determining means operable when said transient state is detected by said transient state detecting means, for determining a transient correction amount of the amount of intake air determined by said intake air amount determining means, in response to the detected value of electric current from said first current detecting means.

7. In an auxiliary air supply control system for controlling the amount of auxiliary air supplied to an internal combustion engine having a first intake passage, a throttle valve arranged within said first intake passage, a second intake passage bypassing said throttle valve, an AC generator mechanically driven by said engine and having a field winding, and at least one electrical load electrically driven by said AC generator, said system including first current detecting means for detecting a value of electric current flowing in said field winding of said AC generator, auxiliary air amount determining means responsive to the detected value of electric current from said first current detecting means for determining a required amount of auxiliary air supplied to said engine through said second intake passage, and output torque changing means responsive to the determined required amount of auxiliary air from said auxiliary air amount determining means for changing the amount of auxiliary air supplied to said engine to thereby change output torque of said engine, the improvement comprising:
second current detecting means for detecting a value of electric current flowing from said AC generator to said at least one electrical load;
transient state detecting means for detecting a transient state of said at least one electrical load, based upon the detected value of electric current from said second current detecting means; and
transient correction amount determining means operable when said transient state is detected by said transient state detecting means, for determining a transient correction amount of the amount of auxiliary air determined by said auxiliary air amount determining means, in response to the detected value of electric current from said first current detecting means.

* * * * *